July 19, 1927.
A. E. RASMUSSEN
1,636,243
PIPELAYING IMPLEMENT
Filed July 19, 1926
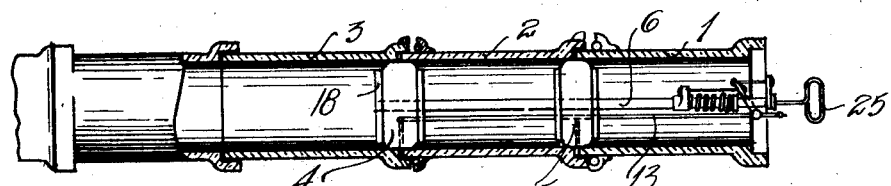
Fig.1
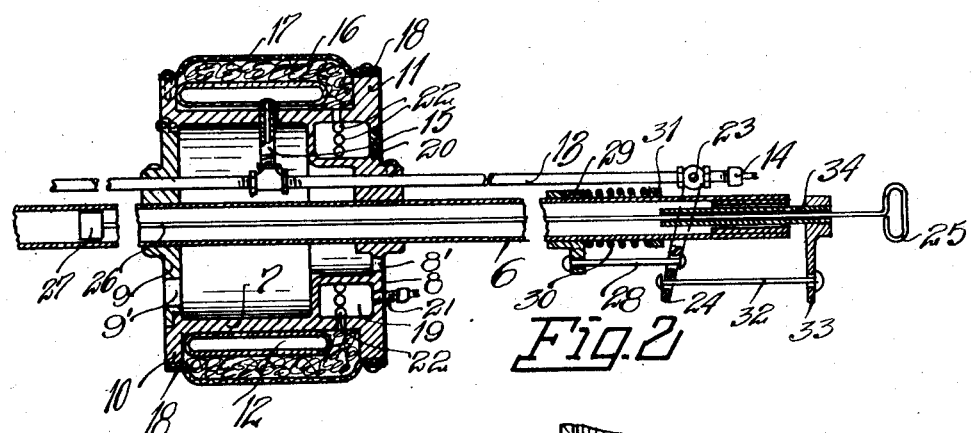
Inventor
Albert E. Rasmussen
By Herbert E. Smith
Attorney Patented July 19, 1927.

1,636,243

UNITED STATES PATENT OFFICE.

ALBERT E. RASMUSSEN, OF YAKIMA, WASHINGTON, ASSIGNOR OF ONE-HALF TO ARTHUR B. FOSSEEN, OF SPOKANE, WASHINGTON.

PIPELAYING IMPLEMENT.

Application filed July 19, 1926. Serial No. 123,425.

My present invention relates to an improved pipe laying implement for use in the construction of sewer, water, drainpipe lines and other conduits, whether underground or laid on the surface of the ground. The primary object of the invention is the provision of an implement for use in the interior of the pipe line whereby the work of laying the pipe-sections may be accomplished with facility and accuracy. The implement which is manipulated by hand includes one or more expansible and collapsible cores for use within the pipe line at the joint or joints, whereby the joints may be securely closed and the sealing or cementing material allowed to properly set; the sections of the pipe line or conduit are properly alined one with another; and the interior of the conduit or pipe line is kept free from accumulation of sediment because of the perfectly smooth surface afforded at the joints by the use of the implement. Motive fluid pressure, preferably air pressure, is utilized for expanding the core or cores into proper position within the pipe joint or joints, and the core is provided with a collapsible, pneumatic pad for the joint having means for preventing adhesion or sticking between the joint parts and the core. The invention consists in certain novel combinations and arrangements of parts as will hereinafter be more fully pointed out and claimed.

In the accompanying drawings I have illustrated one complete example of the physical embodiment, and a slight modification, in which the parts are combined and arranged according to modes I have thus far devised for the practical application of the principles of my invention.

Figure 1 is a view showing in section a portion of a pipe line with the implement of my invention in position for use.

Figure 2 is an enlarged detail longitudinal sectional view showing one of the cores and connections.

Figure 3 is a sectional view showing a slightly modified form of the invention for use when a plurality of pipe-sections are cemented or jointed together in vertical position for subsequent laying in horizontal position in a trench or ditch.

Figure 4 is an enlarged detail sectional view showing the structure of the pneumatic device in Figure 3.

In order that the general arrangement and relation of parts may readily be understood I have shown in Figure 1 several pipe-sections as 1, 2 and 3 having complementary bell and spigot ends that are to be cemented or sealed together with plastic material to form the closed joints, the cement or other sealing material being poured or otherwise applied to form the sealing rings in the joints.

The implement of my invention comprises one or more expansible and collapsible cores that are introduced through the open end of the pipe line for use at the joints between the assembled pipe-sections, while the plastic sealing material is being applied, and are removed after the joint has properly set. In the drawing Figure 1 I have indicated two cores as 4 and 5, which are spaced apart the same distance as the joints of the pipe line and carried on a tubular bar 6.

Each of the cores, as seen in Figure 2, includes an annular shell 7 having a fixed head 8 and a removable head 9 through which heads the tubular bar is passed, and the heads fixed thereto.

The shell 7 is fashioned with spaced annular flanges 10 and 11 between which an annular groove or space is provided, and an annular, pneumatic tube 12 is located in the groove for use in expanding the core. Compressed air as a motive fluid is supplied to the pneumatic tube from an air pipe 13 having a nipple or nozzle 14 for the attachment of an air hose that may be connected to a suitable air pump, and a branch pipe 15 located within the hollow core-shell is extended from the pipe 13 to the pneumatic tube. Complementary branch pipes are used according to the number of expansible cores employed and the main air pipe 13 passes through the heads of the cores or the core-shells for supplying air to the branch pipes.

Around the pneumatic tube is arranged a flexible, annular, pad 16 composed of felt or other similar material that will act as a cushion and is porous, and a porous cover as 17, which may be of canvas or other material is used to enclose and retain the felt of other filling material of the pad. The edges of the cover are attached by means of bands 18 to the two flanges of the core-shell, and it will be apparent that the pad, including the pneumatic tube and cushion, form a flexible cushion that may be expanded into close contact with the adjoining edges of the pipe sections forming the joint to provide a support to hold the edges in proper alinement and to seal the inner portion of the joint against passage of sealing material through the joint. The core with its inflated pneumatic tube and expanded pad or cushion is retained within the joint until the plastic material has set, whereupon the tube is deflated to permit collapse of the pad to contracted size, and the core is moved for use at another pipe joint.

To prevent sticking of the core to the inner face of the pipe line or conduit in case any of the plastic material should ooze through the joint, the pad is provided with a coating or film of powder. The powder may be forced through the porous pad and its porous cover, from an annular powder chamber 19 in the core-shell, to the exterior face of the cover 17. A filling opening for the powder chamber is normally closed by a plug 20 in the head 8 of the core-shell, and an air nipple 21 is also provided in this head for attachment of an air hose, from which pressure is received to force the powder through an annular series of perforations 22 from the chamber into the felt 16 and therethrough to and through the porous pad-cover 17. The powder on the interior of the pad-cover prevents adhesion between the cover and the plastic material or cement that may ooze through the pipe joint.

The air line 13 is provided with a control valve 23, and its valve lever 24, shown in closed position in Figure 2 is operated by reciprocating the handle 25 and its stem 26. The stem projects into the tubular bar 6 and is provided with a slide head 27. At one side of the lever 24 is connected by a link 28 to a slide collar 29 on the tubular bar, and a spring 30 coiled about the bar is interposed between this slide collar and a fixed collar 31 on the bar. At its other side the lever is connected by a link 32 to an arm 33 on a bushing 34 which is slidable in the end of the tubular bar 6 and encloses the stem 26 of the handle 25. In the position of the parts in Figure 2 the spring 30 is holding the valve in closed position to retain the air in the pneumatic tube. By pulling the handle and stem 26 with its head 27 to the right, the head is caused to contact with the inner end of the bushing 34, and the movement of the bushing, through its arm 33 and link 32 causes the lever 24 to turn the valve to open position to permit escape of air from the pneumatic tube. When the handle 25 is released the spring 30 returns the valve to closed position. The valve is of suitable construction, as a three way valve, to provide for admission of air to the cores and to release the air therefrom without leakage from the source of supply.

In some instances it is desirable that a number of pipe sections be cemented or sealed together at their joints before laying in the ditch or trench. For this purpose the sections are superimposed in upright position as in Figure 3, their joints sealed, and after they have properly set or hardened, the length of the pipe line made up of the jointed sections is laid in the trench or ditch. While the pipe sections are in this upright position the implement may be used within the pipe joint as seen in Figure 3 where the core 35 is supported on a tube 36 having a closed end 37, and a suspending head or flange 38, the latter resting in the bell end of the upper pipe section. In addition to the air line 39 for supplying air to the core the tube 36 may be used as the cylinder of a hand pump having a piston 40 in the cylinder and a stem and handle 41. In the head 37 to which the air line is connected a valve seat 42 is provided and a check valve 43 therein controls communication between the interior of the pump cylinder 36 and the pipe line. The valve closes toward the cylinder and opens away from it. When the air line 39 is used the pressure therein closes the valve 43, and when the auxiliary hand pump is used, on its working or compression stroke the valve is opened, but closed on the idle stroke of the piston 40.

The construction, operation and utility of the core 35 do not materially differ from these features of the cores 4 and 5 in Figure 1, and while but one core is shown in Figure 3, it will be understood that additional cores may be used in carrying out the invention as herein illustrated, as well as additional cores may be used in the equipment of Figure 1.

Under certain conditions, especially where ground water is encountered it is advisable to provide a water passage through the cores 4 and 5. This is accomplished by piercing the fixed head 8 at 8' and the movable head 9 at 9' so the operation may be continued without backing up the water flow.

Having thus fully described my invention, what I claim as new and desire to secure by Letters Patent is:—

1. In an implement as described, a core having a pneumatic tube and inflating means therefor, and an expansible cushioning pad surrounding said core and tube.

2. In an implement as described, the combination with a core-shell and an inflatable tube thereon, of a flexible cushioning pad surrounding the tube and a flexible pad-cover secured to said shell.

3. The combination with a flanged core-shell forming an annular groove, an inflatable tube in the groove and means for inflating the tube, of a flexible cushioning pad surrounding the tube, and a flexible pad-cover attached to said flanges.

4. The combination with a rigid annular core-shell having spaced flanges forming an exterior groove, of an inflatable tube in said groove and means for inflating it, a felt cushion-pad surrounding said tube, and a canvas pad-cover attached to said flanges.

5. The combination with a core-shell and its inflatable tube, of a porous pad surrounding the tube and a porous pad cover secured to the shell, and means for forcing a non-adhering powder through the porous pad and cover.

6. The combination with a core-shell having a powder chamber, a pneumatic tube and a porous pad and porous pad-cover for the tube and pneumatic means for forcing powder from the chamber to the exterior of the cover.

In testimony whereof I affix my signature.

ALBERT E. RASMUSSEN.